(12) United States Patent
Keller et al.

(10) Patent No.: US 9,149,846 B2
(45) Date of Patent: Oct. 6, 2015

(54) ROLL AND A ROLL STAND FOR ROLLING STOCK

(75) Inventors: Karl Keller, Hilchenbach (DE); Konrad Roeingh, Hilchenbach (DE)

(73) Assignee: SMS SIEMAG AG, Duesseldorf (DE)

( * ) Notice: Subject to any disclaimer, the term of this patent is extended or adjusted under 35 U.S.C. 154(b) by 1076 days.

(21) Appl. No.: 13/129,938

(22) PCT Filed: Dec. 18, 2009

(86) PCT No.: PCT/EP2009/009139
§ 371 (c)(1),
(2), (4) Date: Jun. 14, 2011

(87) PCT Pub. No.: WO2010/069590
PCT Pub. Date: Jun. 24, 2010

(65) Prior Publication Data
US 2011/0232351 A1 Sep. 29, 2011

(30) Foreign Application Priority Data

Dec. 20, 2008 (DE) .......................... 10 2008 064 303
Aug. 12, 2009 (DE) .......................... 10 2009 037 274

(51) Int. Cl.
*B21B 31/07* (2006.01)
*F16C 13/02* (2006.01)
*F16C 35/02* (2006.01)

(52) U.S. Cl.
CPC ............... *B21B 31/074* (2013.01); *F16C 13/02* (2013.01); *F16C 35/02* (2013.01)

(58) Field of Classification Search
CPC ...... B21B 31/074; B21B 31/08; B21B 31/026
USPC ................ 72/236–238, 245, 247, 249, 252.5; 384/462, 538, 584
See application file for complete search history.

(56) References Cited

U.S. PATENT DOCUMENTS

| 2,072,448 | A | 3/1937 | Hamill |
| 3,352,140 | A | 11/1967 | Pawalkat |
| 4,006,993 | A | 2/1977 | Woerlee |
| 4,093,321 | A | 6/1978 | Ikariishi |
| 5,538,356 | A | 7/1996 | Aarre |
| 8,221,000 | B2 * | 7/2012 | Keller et al. .................. 384/295 |
| 2009/0116774 | A1 | 5/2009 | Keller |

FOREIGN PATENT DOCUMENTS

| AT | 385437 B | 3/1998 |
| DE | 736228 B | 6/1943 |
| DE | 2439017 A | 2/1976 |
| DE | 10007383 A | 8/2001 |

* cited by examiner

*Primary Examiner* — Shelley Self
*Assistant Examiner* — Pradeep C Battula
(74) *Attorney, Agent, or Firm* — Andrew Wilford

(57) ABSTRACT

A bearing for a rolling-mill roll (1) having two stub shafts (2) of which at least one is equipped with a journal bushing (3) mounted to resist torque, a bearing bushing (9) held in a mount (10) surrounding the journal bushing (3), a bearing lubricant film provided between the journal bushing (4) and the bearing bushing (9), and a pressure ring (11) is characterized in that the journal (2) and the journal bushing (3) are connected to one another by a polygonal connection.

3 Claims, 3 Drawing Sheets

ROLL AND A ROLL STAND FOR ROLLING STOCK

CROSS REFERENCE TO RELATED APPLICATIONS

This application is the US national stage of PCT application PCT/EP2009/009139, filed 18 Dec. 2009, published 24 Jun. 2010 as WO2010/069590, and claiming the priority of German patent application 102008064303.3 itself filed 20 Dec. 2008 and German patent application 102009037274.1 itself filed 12 Aug. 2009.

FIELD OF THE INVENTION

The invention relates to a roll, also referred to below as a rolling-mill roll, for rolling stock in a rolling mill, having a roll base body and two stub shafts stepped in from the roll base body, at least one of which is equipped with a journal bushing mounted to resist torque. The invention further relates to a roll stand in which the roll is supported.

BACKGROUND OF THE INVENTION

Rolling-mill rolls are known with two stub shafts rotationally coupled to journal bearings so as to resist torque at limited axial regions by keys. According to DE 26 12 744 [U.S. Pat. No. 4,093,321], the keys are provided outside the region of the roll pressure force acting on the journal bushing. A rolling-mill roll with a journal bushing mounted to resist torque by a key is also known from WO 2007 134655 [US 2009/0116774]. The key or its groove is here very close to the Rotscher line delimiting the outer area of the compressive force transmission. The keys are of greater radial than axial dimension. This is designed to result in a short configuration of the rolls. Furthermore, the width of the roll stand is hereby reduced, which is associated with narrower substructures, narrower rolling mill bays and rolling mill workshops.

On the other hand, a water-cooled furnace roll for conveying thin slabs is known from DE 100 07 383 that is used in particular in the hot zone of a roll hearth furnace. The furnace roll comprises a shaft that rotatably driven and is supported outside the furnace, the shaft having interior passages for throughflow of cooling water. The shaft has support parts for rings that carry the thin slabs with rings whose outer surfaces are of polygonal cross section, each ring being formed with a complementary inner surface. The polygonal cross section of the shaft can also extend over the bearing length of the shaft.

OBJECT OF THE INVENTION

The object of the invention is to further develop a known roll and a known roll stand for rolling stock such that the positive connection between the stub shaft of the roll and a journal bushing placed on the stub shaft can be produced more simply and cost-effectively.

This object is attained according to the invention with a bearing of the type described above in that the stub shaft and the journal bushing are fitted to each other at a polygonal connection.

SUMMARY OF THE INVENTION

Compared to a conventional connection between the stub shafts and the journal bushings by keys, the solution according to the invention has the advantage that fewer parts are necessary, which reduces the manufacturing costs. In particular, no grooves need to be formed in the rolls, the journal bushings and the pressure rings. Using modern production methods on CNC lathes with a "non-circular turning apparatus," stub shafts and journal bushings can be produced with polygonal cross sections. Through FEM (Finite Element Method) design procedures available today any desired polygons can be efficiently produced.

According to the invention the stub shaft advantageously has a step on its outer end with a polygonal outer surface at the step, into which outer surface an associated polygonal inner surface of the journal bushing engages in a positive manner.

In an advantageous further development of this embodiment the stub shaft carries ring on its outer end a pressure ring with a polygonal inner surface that engages in a positive manner into the polygonal outer surface of the step of the stub shaft. With this solution, the polygonal surfaces on the inside of the journal bushing and of the pressure ring interact in each case with the same polygonal outer surface of the stub shaft at the step attached thereto. This solution thus provides the advantage that only one polygonal surface is necessary, but that on the other hand the connections between the journal bushing and the pressure ring on the one hand and the stub shaft on the other hand are one behind the other in the axial direction of the roll.

An alternative solution to this is that the stub shaft carries on its outer end a pressure ring that engages with a polygonal outer surface in a positive manner into a polygonal inner surface that the stub shaft is formed with at an inside step. On the other hand, the pressure ring fits complementarily with its polygonal outer surface into an inner surface of a journal bushing at the step.

With this solution, two interengagements must be formed by polygonal surfaces. This is more complex in production, but has the advantage that with this solution the roll is shorter than with the solution described above, according to which the journal bushing and the pressure ring with the same polygonal outer surface of the stub shaft interact axially one behind the other. In a further embodiment of the invention, the journal bushing and the pressure ring are formed unitarily with one another as one-piece so that a lower number of parts is necessary.

The invention also relates to a rolling-mill roll having at least one bearing of the surface described above.

BRIEF DESCRIPTION OF THE DRAWING

The invention is explained in more detail below based on illustrated embodiments. Therein.

SPECIFIC DESCRIPTION OF THE INVENTION

Figure 1:
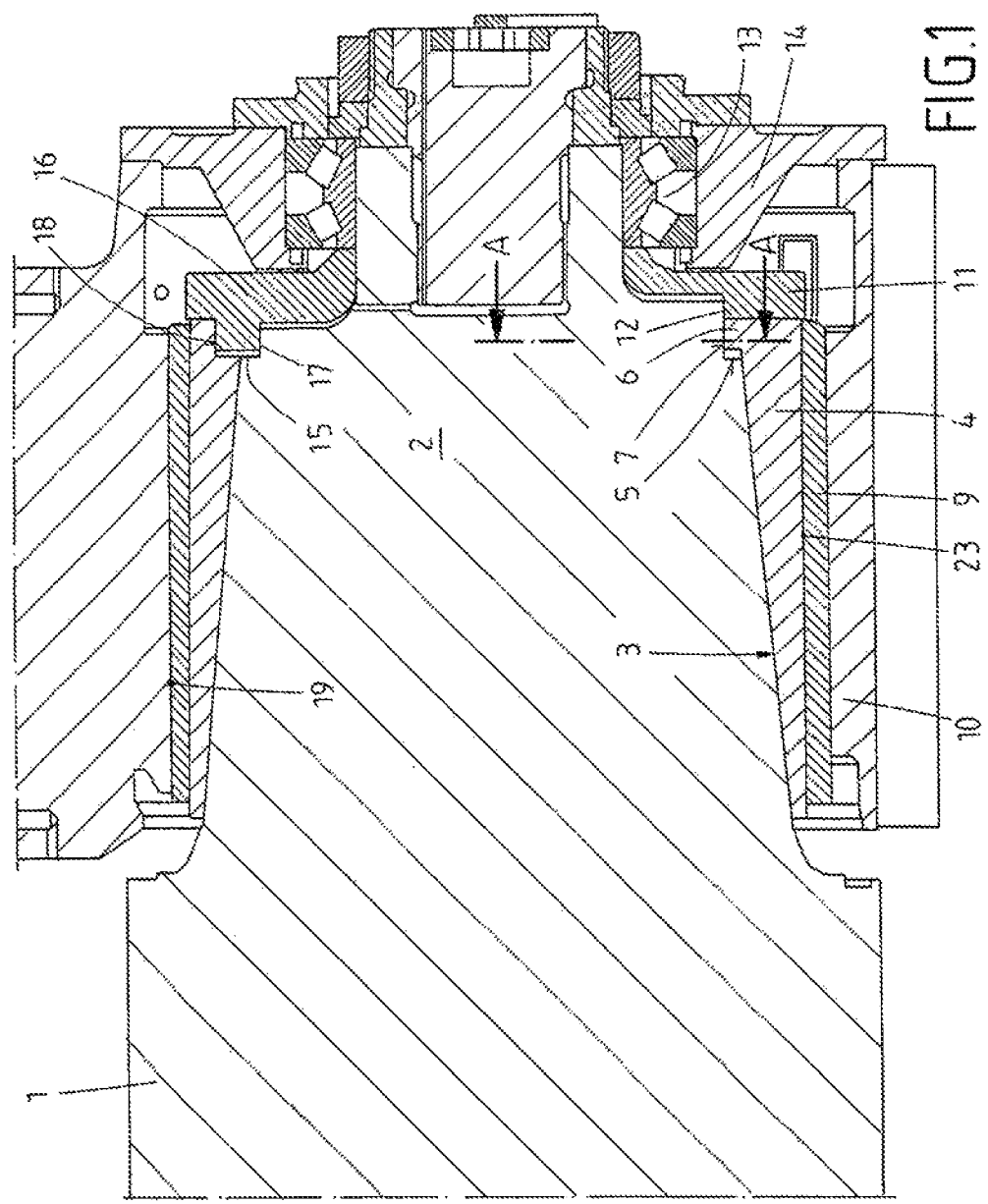
FIG. 1 is a longitudinal section through two embodiments of a rolling-mill roll supported in a mount, the first embodiment being shown below the longitudinal axis and the second embodiment above the longitudinal axis of the rolling-mill roll.
Figure 3:
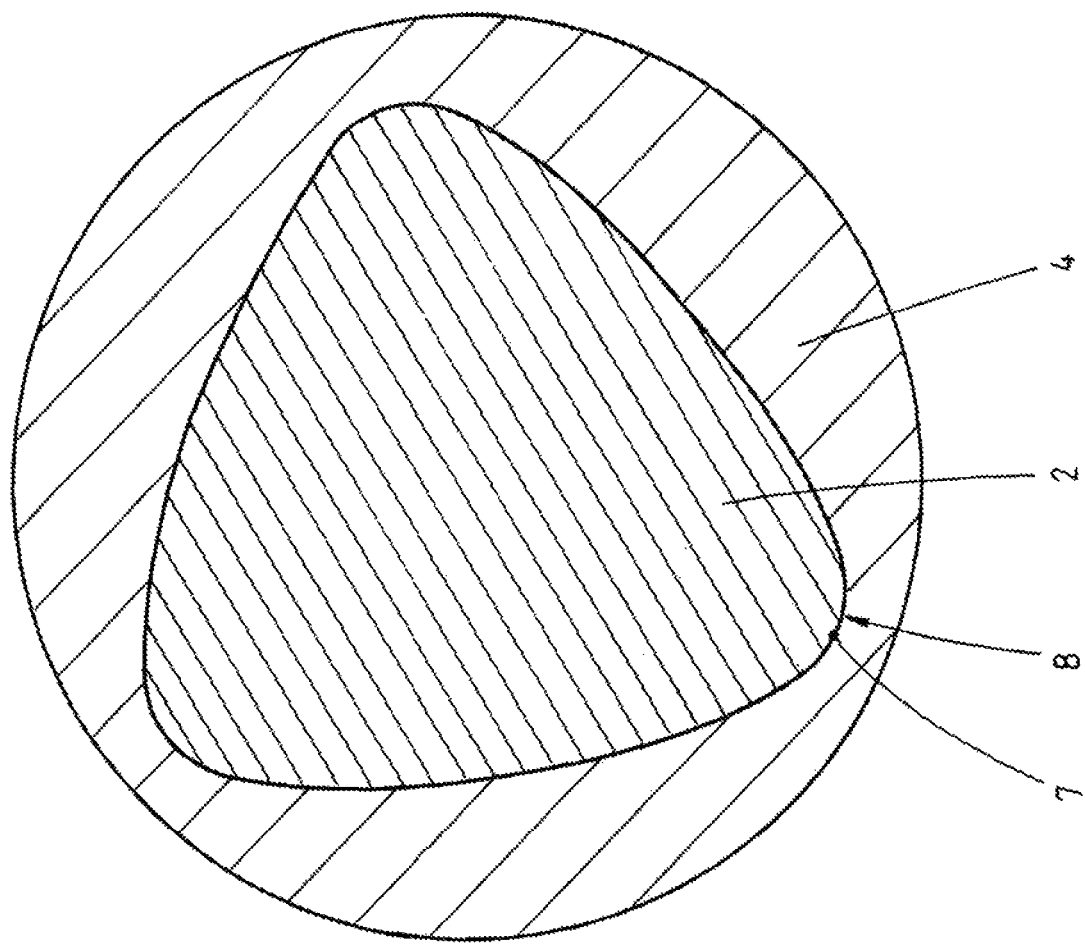
FIG. 3 is a cross-sectional view taken along line A-A of FIG. 1.

A rolling-mill roll 1 (FIG. 1) has a stub shaft 2 with an inner portion 3 having a frustoconical outer surface. Alternatively, a cylindrical outer surface can be provided on the inner portion 3. A complementary journal bushing 4 having a bottom surface 23 fits around the stub shaft 2. At its free end the stub shaft 2 is formed between the inner portion 3 and an outer portion 7 with a step 5 fitting with an inset rim 6 of the journal bushing 4. At the outer portion 7 axially outward of the step 5, the stub shaft 2 has a polygonal outer surface, for example, as shown in FIG. 3, a triangle with rounded corners 8 (FIG. 3). The journal bushing 4 surrounds and its inset rim 6 complementarily engages the outer surface of the outer portion 7 with its inner surface 8 of the same polygonal shape. Instead of the triangular shape any other desired polygonal shape or polygon can be used, that is, for example, quadrangular or pentagonal shapes, etc.

Because of the polygonal shape, the stub shaft 2 and the journal bushing 4 cannot rotate relative to one another. The journal bushing 4 is surrounded by a fixed bearing bushing 9 that in turn is secured in a mount 10.

A stepped pressure ring 11 is also fitted complementarily with the polygonal outer surface 7 of the stub shaft 2 at its outer end, the pressure ring 11 having an inner polygonal surface 12 that is complementary to the surface 7 of the journal 4. The roll 1 is supported in the mount 10 by tapered roller bearings 13 and an end cover 14.

In an alternative embodiment, the stub shaft 2 is connected in a positive manner by a step 15 to a pressure ring 16 by a polygonal surface 17, the surface 17, for example, being the same as the surface 7.

In this embodiment, a journal bushing 19 fits complementarily with its inner polygonal surface 18 with an outer surface of the pressure ring 16, so that in this embodiment two polygonal surfaces 17 and 18 are necessary in contrast to the single polygonal surface 7 according to the first embodiment, in order to produce a positive rotational coupling between the stub shaft 2 and the journal bushing 19. On the other hand, this embodiment has the advantage that it is shorter than the first embodiment.

Figure 2:
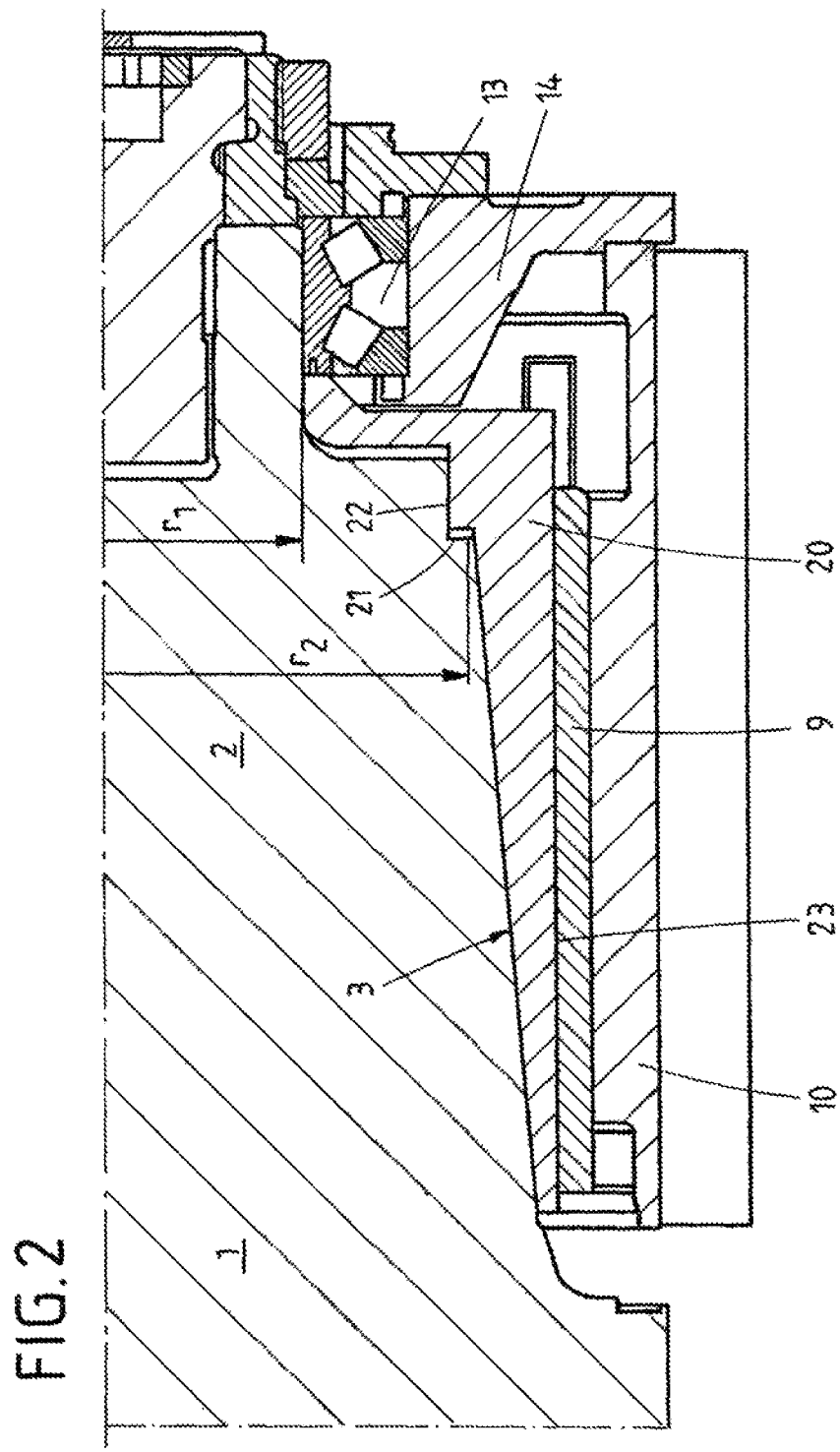
FIG. 2 is a longitudinal section through a further embodiment of a rolling-mill roll.

In a further embodiment (FIG. 2), a journal bushing and a pressure ring are formed as a one-piece part 20 that is formed like the stub shaft 2 with a step 21 that has a polygonal surface 22 so the inner surface of the part 20 and the outer surface of the stub shaft 2 are complementary. This embodiment of the invention has the advantage that only a single polygonal surface 22 is sufficient for the dimensionally stable connection between the stub shaft 2 and the journal bushing.

The step 21 like the steps 5 and 15 can also vary radially between a minimum radius $r_1$ and a maximum radius $r_2$.

The invention claimed is:

1. A rolling-mill roll comprising:
    a body extending along and centered on an axis and having a generally cylindrical outer surface;
    a stub shaft projecting coaxially from an end of the body and having an outer surface formed with
        an inner portion stepped radially inward from the outer surface of the body,
        an outer portion stepped radially inward from the outer surface of the body, with the inner portion axially between the outer portion and the body, and
        a step between the inner and outer portions and forming an axially outwardly directed shoulder face, the outer portion being of polygonal cross section perpendicular to the axis;
    a journal bushing fitted to the stub shaft and having a stepped inner surface having inner and outer portions fitting snugly complementarily with the respective inner and outer portions of the stub shaft; and
    a pressure ring that engages with a polygonal inner surface in a direct manner with the polygonal-section outer portion of the stub shaft and that extends axially outward from the journal bushing around the stub shaft.

2. The rolling-mill roll defined in claim 1 wherein each journal ring has a sleeve-shaped outer part having an inner surface of polygonal cross section and the pressure ring has an outer surface complementarily fitting with the inner surface of the sleeve-shaped outer part.

3. The rolling-mill roll defined in claim 1 wherein the journal ring and pressure ring are unitarily formed with each other.

* * * * *